United States Patent [19]

Younce et al.

[11] Patent Number: 5,521,908
[45] Date of Patent: May 28, 1996

[54] METHOD AND APPARATUS FOR PROVIDING REDUCED COMPLEXITY ECHO CANCELLATION IN A MULTICARRIER COMMUNICATION SYSTEM

[75] Inventors: Richard C. Younce, Wakarusa; Peter J. W. Melsa, South Bend, both of Ind.

[73] Assignee: Tellabs Operations Inc., Lisle, Ill.

[21] Appl. No.: 425,465

[22] Filed: Apr. 20, 1995

[51] Int. Cl.$^6$ .................................................. H04B 3/23
[52] U.S. Cl. .......................................... 370/32.1; 379/410
[58] Field of Search ................................ 370/24, 32.11, 370/32; 379/406, 410, 411, 93; 375/229, 230, 231, 232, 285, 222, 346, 350, 296

[56] References Cited

U.S. PATENT DOCUMENTS

| | | | |
|---|---|---|---|
| 4,438,511 | 3/1984 | Baran | 370/19 |
| 4,742,510 | 5/1988 | Quatieri, Jr. et al. | 370/32.1 |
| 4,757,495 | 7/1988 | Decker | 370/76 |
| 4,777,640 | 10/1988 | Turner | 375/118 |
| 4,935,919 | 6/1990 | Hiraguchi | 370/32.1 |
| 4,943,980 | 7/1990 | Dobson | 375/42 |
| 4,970,715 | 11/1990 | McMahan | 370/32.1 |
| 5,058,134 | 10/1991 | Chevillat | 375/39 |
| 5,117,418 | 5/1992 | Chaffee | 370/32.1 |
| 5,128,964 | 7/1992 | Mallory | 375/39 |
| 5,163,044 | 11/1992 | Golden | 370/32.1 |
| 5,206,886 | 4/1993 | Bingham | 375/97 |
| 5,220,570 | 6/1993 | Lou | 371/43 |
| 5,226,081 | 7/1993 | Hinokimoto | 380/34 |
| 5,228,062 | 7/1993 | Bingham | 375/97 |
| 5,285,474 | 2/1994 | Chow | 375/13 |
| 5,317,596 | 5/1994 | Ho | 375/14 |

OTHER PUBLICATIONS

Chow et al. "A discrete Multitone Tranceiver System for HDSL Applications." Aug. '91 pp. 895–908.
Chow et al. "Equilizer Training Algorithms for Multicarrier Modulations Systems." May '93.
Chow et al. "A Cost–Effective Maximum Likelihood Receiver for Multicarrier Systems" Jun. '92.
Bingham "Multicarrier Modulation for Data Transmission" May '90.
Cioffi "A Multicarrier Primer", Nov. '91 pp. 1–17.

Primary Examiner—Benedict V. Safourek
Assistant Examiner—Ajit Patel
Attorney, Agent, or Firm—Gary R. Jarosik

[57] ABSTRACT

A data communication system is provided including a multicarrier transmitter which encodes and modulates input data into a plurality of carriers, a channel which distorts signals input to it by the transmitter, an echo path which also distorts signals, and a multicarrier receiver which receives signals from the channel and minimizes the distortions through the use of a SIRF. The method of determining the set of time domain SIRF parameters generally includes the steps of approximating the original channel and echo impulse responses, optionally modeling the channel impulse response, optionally modeling the echo impulse response, computing SIRF coefficients based upon the combined approximated or modeled channel impulse response and the approximated or modeled echo impulse response, calculating a SSNR for the calculated SIRF coefficients, and repeating the steps a predetermined number of times to determine those coefficients with the best

15 Claims, 2 Drawing Sheets

METHOD AND APPARATUS FOR PROVIDING REDUCED COMPLEXITY ECHO CANCELLATION IN A MULTICARRIER COMMUNICATION SYSTEM

BACKGROUND OF THE INVENTION

This invention relates generally to a system for the transmission and reception of data signals and, more particularly, relates to a method and apparatus for limiting distortions caused by both the transmission medium and the echo path in a multicarrier transceiver.

Multicarrier transceiver design typically requires trade-offs based on sampling rate, bit rate, and symbol rate. Many of the trade-offs are impacted by the ratio of symbol length to cyclic prefix length. A cyclic prefix is typically used to ensure that samples from one symbol do not interfere with the samples of another symbol. The length of the cyclic prefix used is determined by the length of the impulse response of the effective physical channel. However, using a long cyclic prefix is seen to reduce the throughput of the transceiver which is an undesirable result.

Specifically, in discrete multitone transceivers, each symbol is comprised of N time samples, $x(n)$, to be transmitted to the remote receiver plus a cyclic prefix consisting of v time samples. The cyclic prefix is simply the last v samples of the original N samples to be transmitted. The cyclic prefix length is determined by the length of the impulse response of the channel and is chosen to minimize the intersymbol interference. If the impulse response of the channel is of length $v+1$ or shorter then a cyclic prefix of length v is sufficient to completely eliminate inter-symbol interference. If the impulse response of the channel is longer than $v+1$ then some inter-symbol interference occurs. Since the efficiency of the transceiver is reduced by a factor of $N/(N+v)$ it is clearly desirable to make v as small as possible.

To minimize the cyclic prefix, as shown in prior art FIG. 1, a small time domain FIR filter, referred to as a shortened impulse response filter (SIRF), is typically inserted in the receiver immediately following the A/D converter. The purpose of this filter is to shorten the impulse response of the effective channel. The effective channel is defined as the combination of the transmit filters, physical channel, receive filters, and the SIRF. Denoting the impulse response of the physical channel and filters $h_c(n)$, the output of the SIRF can be expressed as $$y(n)=x(n)*(h_c(n)*w(n))$$

where $w(n)$ is the impulse response of the SIRF and $*$ denotes the convolution operator. It can be shown that if $x(n)$ is transmitted with a cyclic prefix of length v and the effective channel $$h_{eff}(n)=h_c(n)*w(n)$$

is at most of length $v+1$, that $y(n)$ will only depend upon the current symbol's samples $x(n)$ being transmitted. If the effective channel is not constrained to a length of $v+1$, then $y(n)$ will depend upon the current symbol's samples $x(n)$ as well as the previous symbol's samples $x_p(n)$. The previous transmit symbol will then contribute inter-symbol interference which decreases the performance of the transceiver.

Regardless of the choice of $w(n)$, it is impossible to shorten the impulse response perfectly as some energy will lie outside the largest $v+1$ samples of $h_{eff}(n)$. As a measure of the inter-symbol interference one can measure the shortening signal to noise ratio (SSNR) which is the ratio of the energy in the largest $v+1$ consecutive samples to the energy in the remaining samples. The largest $v+1$ consecutive samples will not necessarily start with the first sample. This delay, d, is normally compensated for at the receiver by delaying the start of the receive symbol. The SSNR is defined as:

$$SSNR = 10\log\left(\frac{\sum_{i=d}^{d+v} h_{eff}(i)^2}{\sum_{i=0}^{d-1} h_{eff}(i)^2 + \sum_{i=d+v+1}^{\infty} h_{eff}(i)^2}\right)$$

An example of a technique for calculating the parameters of the above described SIRF may be seen in U.S. Pat. No. 5,285,474 to Chow et al. which patent is incorporated herein by reference in its entirety. The '474 patent discloses a method for optimizing a set of parameters of an equalizer or SIRF to be used to equalize a multicarrier data signal that has been transmitted through a distorting channel. The method includes the steps of intializing the parameters, repeatedly sending a training sequence through the channel to the receiver, using the equalizer parameters, the received sequence, and a local replica of the training sequence to update a set of channel target response parameters, windowing the channel target response parameters, using the channel target response parameters, the received sequence and the local replica to update the equalizer parameters, and windowing the equalizer parameters. As discussed therein, the training process is repeated until a predetermined convergence condition is detected.

While the disclosed method works for its intended purpose, the method suffers the disadvantage of failing to provide a method for also reducing distortions caused by echo. In particular, known prior art systems, exemplified by the system discussed in the '474 patent, fail to provide a transceiver which has the capability to simultaneously and efficiently minimize the distortions caused by echos. Furthermore, the known methods of calculating equalizer parameters discussed in the prior art are also typically hampered by stability and convergence problems. As such, a need exists to provide a discrete multitone transceiver which incorporates both an improved method for minimizing distortions caused by transmission through a distorting channel and distortions caused by signals traveling through the echo path.

As a result of this existing need, it is an object of the present invention to provide a method for calculating the parameters of a SIRF that will jointly minimize distortions which result from both the distorting channel and the echo path.

It is a further object of the present invention to provide a method for calculating the parameters of a SIRF that is much faster and more assured of correct convergence than any previously known method.

It is another object of the present invention to provide a method which is suitable for on-line implementation.

It is yet another object of the present invention to provide a method which minimizes SIRF coefficient calculating time.

It is still another object of the present invention to develop an algorithm for impulse response shortening that is realizable in off the shelf DSP components.

SUMMARY OF THE INVENTION

In accordance with the present invention a method and apparatus for minimizing distortions in a multicarrier communication system is provided. Specifically, the invention resides in the use of a finite impulse response filter used to jointly shorten the channel and echo impulse responses. Furthermore, the invention includes an improved method for determining the coefficients of the filter based upon the notion of joint shortening.

In particular, the invention resides in a data communication system including a multicarrier transmitter which encodes and modulates input data into a plurality of carriers, a channel which distorts signals input to it by the transmitter, an echo path which also distorts signals, and a multicarrier receiver which receives signals from the channel and echo path and minimizes these distortions through the use of a SIRF. The method of determining the set of time domain SIRF parameters generally includes the steps of approximating the channel and echo impulse responses, optionally selecting some portion of the channel impulse response, optionally selecting some portion of the echo impulse response, computing SIRF coefficients based upon the combined full or partial approximated channel impulse response and the full or partial approximated echo impulse response, calculating a SSNR for the SIRF coefficients, and optionally repeating the steps a predetermined number of times to determine those coefficients with the best SSNR.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiments shown in the following drawings in which.

DETAILED DESCRIPTION

While the invention can be used in conjunction with any type of transceiver capable of transmitting and receiving data over any type of communication medium, it will be described hereinafter in the context of a discrete multitone transceiver used to simultaneously transmit and receive data over a conventional telephone local loop as the preferred embodiment thereof.

Figure 1:
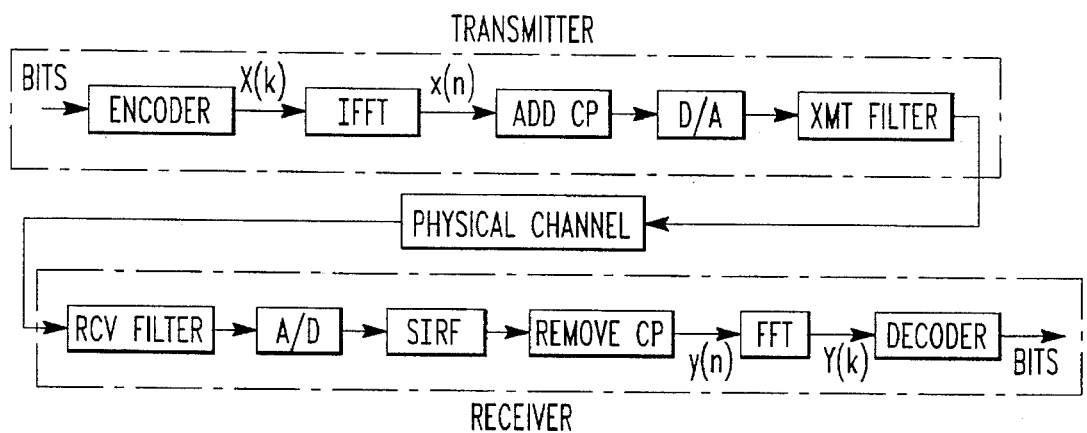
FIG. 1 schematically illustrates a prior art system having channel distortion cancellation.
Figure 2:
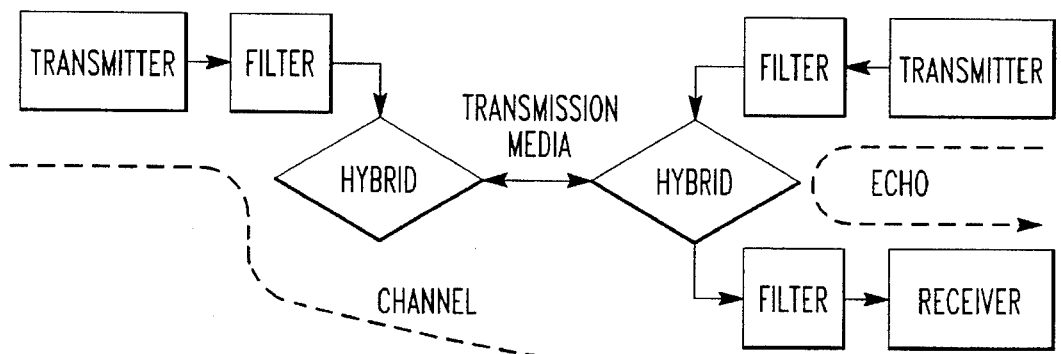
FIG. 2 schematically illustrates the system in which the present invention resides including an echo path which functions to distort signals received from the local transmitter.

Turning to FIG. 2, when a discrete multitone transceiver is used for bi-directional communication over a single cable there are two paths to consider, channel and echo. The channel is associated with communication between two remote transceivers and carries the actual data to be transmitted from one end to the other end. The echo path exists between a local transmitter and its own receiver due to impedance mismatch in the hybrid circuitry. The receive signal is the combination of the far end signal through the channel and the near end signal through the echo path plus additive channel noise.

To reduce these distortions, a SIRF is utilized to jointly shorten both the channel and echo responses. As will be discussed in greater detail hereinafter, the SIRF coefficients will generally be produced by determining an approximation of the channel and echo impulse responses, optionally modeling the approximated channel impulse response and/or the approximated echo impulse response over any predetermined sample set size, optionally determining the optimal model placement (i.e. initial sample) for the channel and/or echo impulse response models, and computing the SIRF coefficients based upon the approximated and/or modeled channel and echo response SSNR.

Figure 3:
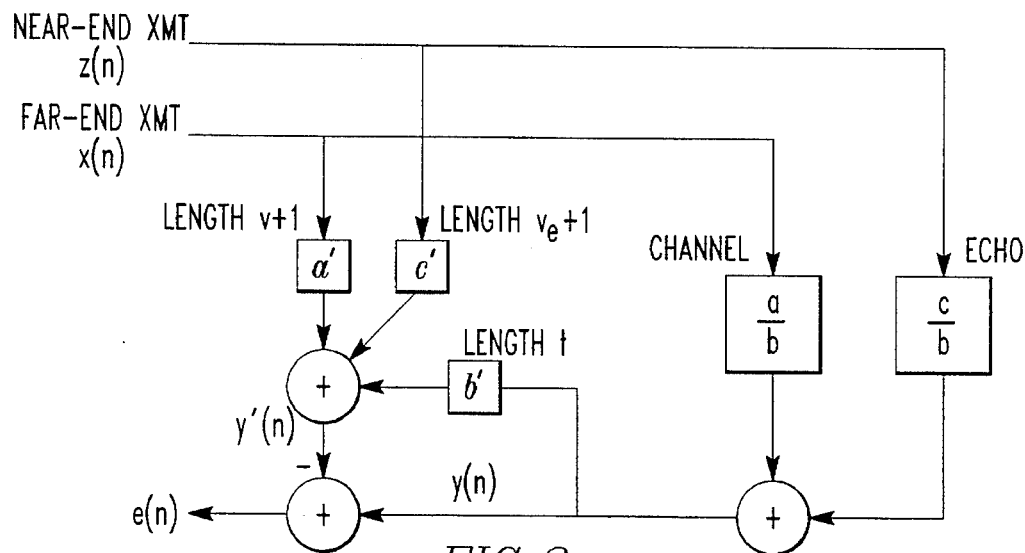
FIG. 3 schematically illustrates a pole-zero-zero model for joint shortening.

Turning to FIG. 3, illustrated is an approach for joint shortening. Specifically, the approach illustrated utilizes a pole-zero-zero model utilizing the joint least-squares minimization approach. In the illustration, a/b symbolizes the actual channel impulse response $h_c[n]$, c/b symbolizes the actual echo impulse response $h_e[n]$, $\hat{a}$ represents the modeled zeros of the channel, $\hat{c}$ represents the modeled zeros of the echo, and $\hat{b}$ represents the modeled poles (later used as the coefficients of the SIRF).

Figure 4:
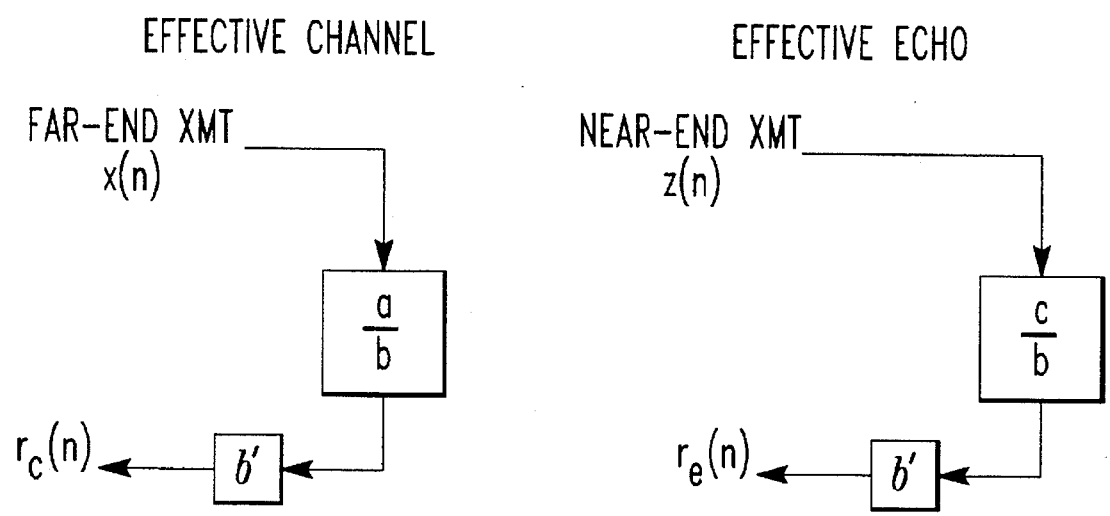
FIG. 4 schematically illustrates the effective channel and the effective echo incorporating the use of the resulting SIRF parameters after computation.

The joint least-square approach seeks to fit a pole-zero-zero model to the echo and the channel impulse responses. Turning to FIG. 4, the original impulse of the channel is represented as a transfer function $h_c=a/b$ and the echo as $h_e=c/b$. The joint least squares approach finds the best pole-zero-zero model with transfer function $\hat{a}/\hat{b}$ for channel and $\hat{c}/\hat{b}$ for the echo. If the poles of the model, $\hat{b}$, are used for the coefficients of the SIRF, then the effective channel will have a transfer function of:

$$\left(\frac{a}{b}\right)\hat{b} \approx a \approx \hat{a},$$

and the effective echo will have a transfer function of:

$$\left(\frac{c}{B}\right)\hat{b} \approx c \approx \hat{c}.$$

As seen, the SIRF cancels the poles of both the physical channel and the echo path, leaving the zeros of the model. If the number of zeros in the model for the channel is chosen to be v+1 then the resulting effective channel impulse response will be approximately of length v+1. The number of zeros in the model for the echo is chosen based upon the desired computational complexity of the echo canceler.

Since the channel must be shortened to remove intersymbol interference, while echo shortening is beneficial to reduce complexity, the number of zeros used for the two responses do not have to be equal.

In general, the orders of the model used correspond to design decisions. The number of poles, t, corresponds to the length of the SIRF. The number of zeros for the channel is v+1, where v corresponds to the length of the cyclic prefix. The number of zeros for the echo, $v_e+1$, affects the echo canceler complexity. Since the computational complexity of the coefficient calculation algorithm is determined by the largest of $v, t, v_e$ it is desirable to pick them as small as possible. Typically, v and $v_e$ are larger than t. Therefore, it is preferred that the algorithm has computations that depend upon the value of t.

It has been seen that setting v=t and $v_e=t$ (only during the modeling phase of the procedure) and using an intelligent model placement algorithm achieves near optimal shortening. Model placement can be accomplished by trying different model locations, computing SIRF coefficients, calculating the effective shortening, and then picking the model location and SIRF coefficients that resulted in the best joint shortening.

The first step in the process is approximating both $h_c[n]$ and $h_e[n]$. $h_c[n]$ may be approximated in any known manner such as by repeatedly sending a known signal, $x[n]$, from the transmitter and comparing the resulting signal, $y[n]$, obtained at the receiver with a replica signal $\hat{x}[n]$ generated by the receiver. Similarly, $h_e[n]$ may be determined in a like manner. Preferably, the signals sent to the receiver are varied and the resulting responses $h_c[n]$ and $h_e[n]$ are averaged and/or compensated to alleviate any known problems, for example aliasing and additive channel noise. Modeling of the approximated impulse response may then be performed by choosing a sample set from the samples which comprise the approximated impulse response which sample set or model will thereafter be used during generation of the SIRF coefficients.

As discussed, prior to calculating the SIRF coefficients, placement of the model should be completed. This can be accomplished by trying all possible model locations, computing the SIRF coefficients, calculating the SSNR, and then selecting the SIRF coefficients resulting in the best SSNR. However, this is seen to be computationally expensive and wasteful. Since the channel often has an impulse response which is very short prior to the peak (pre-cursor) and very long after the peak (post-cursor) impulse response of the channel can often be represented as a few zeros creating the pre-cursor response and a few poles and zeros creating the post-cursor response. Taking this into account, the amount of computation required to calculate the SIRF coefficients can be reduced. It is preferred that only that portion of the channel response from the peak minus one sample is modeled. With the echo response, however, it may be necessary to try multiple model placements and calculate the effective shortening at each step.

To minimize squared error during SIRF coefficient computation a least squares algorithm is preferably used. Defining the parameter vector as:

$$\Theta = [\hat{a}_0 \hat{a}_1 \ldots \hat{a}_v -\hat{b}_1 -\hat{b}_2 \ldots -\hat{b}_t \hat{c}_0 \hat{c}_1 \ldots \hat{c}_{v_e}]^T$$

and the regressor vector as:

$$\Phi(n) = [x(n)x(n-1) \ldots x(n-v)y(n-1)y(n-2) \ldots y(n-t)z(n)z(n-1) \ldots z(n-v_e)]^T = [x^T y^T z^T]^T$$

$y(n)$ can be estimated as:

$$\hat{y}(n) = \Theta^T \Phi(n)$$

and the error as:

$$e(n) = y(n) - \hat{y}(n)$$

As it is desired to minimize squared-error, the parameter vector should be chosen as:

$$\Theta_{LS} = R^{-1} r$$

where $$R = E\{\Phi(n)\Phi^T(n)\}$$

and $$r = E\{y(n)\Phi(n)\}$$

Since the joint least squares approach requires the inversion of an array, the approach may be infeasible for real-time system implementation. Therefore, a more suitable approach is to embed the pole-zero-zero model into the form of a multi-channel auto-regressive (AR) model.

For simplicity of description, it is assumed that the number of desired zeros modeled for both the channel and echo is $v+1$ and it is assumed that the length of the SIRF, $t$, is greater than or equal to $v$. Never-the-less, it will be appreciated by those skilled in the art that the more generic case of $v_c$, $v_e$, and $t$ having differing values can be equally considered applying the principals set forth herein. The pole-zero-zero model can thus be written as:

$$\hat{y}_k = -\hat{b}_1 y_{k-1} - \ldots -\hat{b}_t y_{k-t} + \hat{a}_0 x_k + \ldots + \hat{a}_v x_{k-v} + \hat{c}_0 z_k + \ldots + \hat{c}_v z_{k-v}$$

where the algorithm computes the $t+2v+2$ parameters recursively. In the $j^{th}$ recursion of the algorithm ($1 \leq j \leq t$) the $(j, j-\delta, j-\delta)$ pole-zero-zero model is generated from the $(j-1, j-\delta-1, j-\delta-1)$ pole-zero-zero model, where $\delta = t-v \geq 0$. For the $j^{th}$ recursion, the $(j, j-\delta, j-\delta)$ pole-zero-zero model can be written as:

$$y_k = -\hat{b}_1^j y_{k-1} - \ldots -\hat{b}_j^j y_{k-j} + \hat{a}_0^j x_k + \ldots + \hat{a}_{j-\delta}^j x_{k-j+\delta} + \hat{c}_0^j z_k + \ldots + \hat{c}_{j-\delta}^j z_{k-j+\delta} + e_k^j$$

Defining $U_k = [y_k \, x_{k+\delta} \, z_{k+\delta}]^T$ the pole-zero-zero model can be rewritten into the form of a multi-channel AR model $$U_k = \begin{bmatrix} -\hat{b}_1^j & 0 & 0 \\ 0 & 0 & 0 \\ 0 & 0 & 0 \end{bmatrix} \begin{bmatrix} y_{k-1} \\ x_{k+\delta-1} \\ z_{k+\delta-1} \end{bmatrix} + \ldots +$$

$$\begin{bmatrix} -\hat{b}_\delta^j & \hat{a}_0^j & \hat{c}_0^j \\ 0 & 0 & 0 \\ 0 & 0 & 0 \end{bmatrix} \begin{bmatrix} y_{k-\delta} \\ x_k \\ z_k \end{bmatrix} +$$

$$\begin{bmatrix} -\hat{b}_{\delta+1}^j & \hat{a}_1^j & \hat{c}_1^j \\ 0 & 0 & 0 \\ 0 & 0 & 0 \end{bmatrix} \begin{bmatrix} y_{k-\delta-1} \\ x_{k-1} \\ z_{k-1} \end{bmatrix} + \ldots +$$

$$\begin{bmatrix} -\hat{b}_j^j & \hat{a}_{j-\delta}^j & \hat{c}_{j-\delta}^j \\ 0 & 0 & 0 \\ 0 & 0 & 0 \end{bmatrix} \begin{bmatrix} y_{k-j} \\ x_{k-j+\delta} \\ z_{k-j+\delta} \end{bmatrix} + \begin{bmatrix} e_k^j \\ x_{k+\delta} \\ z_{k+\delta} \end{bmatrix} =$$

$$-\theta_1^j U_{k-1} - \ldots - \theta_j^j U_{k-j} + \begin{bmatrix} e_k^j \\ x_{k+\delta} \\ z_{k+\delta} \end{bmatrix} \text{ where}$$

$$-\theta_i^j : \begin{bmatrix} \begin{bmatrix} -\hat{b}_i^j & 0 & 0 \\ 0 & 0 & 0 \\ 0 & 0 & 0 \end{bmatrix} & 1 \leq i \leq \delta - 1 \\ \begin{bmatrix} -\hat{b}_i^j & \hat{a}_{i-\delta}^j & \hat{c}_{i-\delta}^j \\ 0 & 0 & 0 \\ 0 & 0 & 0 \end{bmatrix} & \delta \leq i \leq j \end{bmatrix}$$

Multiplying both sides of the multi-channel AR model by $U_{k-i}^T$ and taking expectations and noting that the error $e_k^j$ is orthogonal to $x_{k+\delta}^j$ and $z_{k+\delta}^j$ at each iteration yields $$R(0) + \theta_1^j R(-1) + \ldots + \theta_j^j R(-j) = \frac{f}{j} \text{ for } i = 0 \quad (1)$$

$$R(i) + \theta_1^j R(i-1) + \ldots + \theta_j^j R(i-j) = 0 \text{ for } 1 \leq i \leq j \quad (2)$$

Where

-continued $$R(i) = E\{U_k U_{k-i}^T\} = \begin{bmatrix} R_{yy}(i) & R_{yx}(i-\delta) & R_{yz}(i-\delta) \\ R_{xy}(i+\delta) & R_{xx}(i) & 0 \\ R_{zy}(i+\delta) & 0 & R_{zz}(i) \end{bmatrix}$$

$$R(-i) = R^T(i),$$

and $$\sum_{j}^{f} = \begin{bmatrix} R_{ee}(0) & 0 & 0 \\ R_{xy}(\delta) & R_{xx}(0) & 0 \\ R_{zy}(\delta) & 0 & R_{zz}(0) \end{bmatrix}$$

If $x(n)$ and $z(n)$ are assumed to be independent and white and $$y(n)=h_c(n)*x(n)+h_e(n)*z(n)$$

then $$R_{xx}(k)=S_x\delta(k),$$

$$R_{zz}(k)=S_z\delta(k),$$

$$R_{xy}(k)=R_{yx}(-k)=S_x h_c(-k),$$

$$R_{zy}(k)=R_{yz}(-k)=S_z h_e(-k)$$

and $$R_{yy}(k) = S_x \sum_{i=0}^{\infty} h_c(i)h_c(i-k) + S_z \sum_{i=0}^{\infty} h_e(i)h_e(i-k).$$

Eqs. (1)–(2) represent a $j^{th}$ order multi-channel AR model where this system of linear equations can be solved efficiently using the multi-channel version of the Levinson Algorithm. The Levinson algorithm can be formulated in a normalized form which yields variables bounded by one. Such normalization yields a realizable algorithm in off-the-shelf fixed-pt. DSP chips. After the j=t recursion, the (t,v,v) pole-zero-zero model coefficients can be read from $\Theta_i^t(1 \leq i \leq t)$. As is understood, the coefficients utilized are those with the best SSNR.

As previously discussed, it is not always optimal to model an impulse response from the beginning as this may waste a portion of the $v_e+1$ or $v_c+1$ zeros available on flat delay or small samples of the impulse response. To avoid this problem, the location of the zeros can be adjusted to take advantage of the flat delay(s) wherein the modified pole-zero-zero model becomes:

$$\hat{y}_k = -\hat{b}_1 y_{k-1} - \ldots - \hat{b}_t y_{k-t} + \hat{a}_0 x_{k-d_c} + \ldots + \hat{a}_v x_{k-d_c-v} + \hat{c}_0 z_{k-d_e} + \ldots + \hat{c}_{v_e} z_{k-d_e-v_e}$$

It also may be desired to adjust the offset of the poles wherein the modified pole-zero-zero model vector becomes:

$$y_k = -\hat{b}_1 y_{k-d-1} - \ldots - \hat{b}_t y_{k-d-t} + \hat{a}_0 x_k + \ldots + \hat{a}_v x_{k-v} + \hat{c}_0 z_k + \ldots + \hat{c}_{v_e} z_{k-v_e}$$

Preferably, the location of the largest v+1 consecutive samples of the channel response will be offset a predetermined number of samples (for example the peak −12) to account for flat delay in the effective channel while the echo model will be positioned in correspondence with the first sample.

It should be apparent from the preceding description that this invention has among other advantages, the advantage of reducing inter-symbol interference resulting in higher performance while reducing the complexity of the echo canceler resulting in lowered cost.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalents thereof.

We claim:

1. In a data transmission system including a transmitter, a distorting channel, a distorting echo path, and a receiver including a SIRF, a method for efficiently minimizing distortions in said data transmission system jointly caused by said distorting channel and by said distorting echo path comprising the steps of:

(a) approximating the channel impulse response of said distorting channel;

(b) approximating the echo impulse response of said distorting echo path;

(c) computing a set of time domain SIRF coefficients based upon said approximated channel impulse response in combination with said approximated echo impulse response; and (d) utilizing said SIRF coefficients in said SIRF to efficiently minimize distortions in said data transmission system jointly caused by said distorting channel and said distorting echo path.

2. The method as recited in claim 1, further comprising the step of modeling said channel impulse response over a predetermined number of samples and wherein step (c) utilizes said modeled channel impulse response to compute said SIRF coefficients.

3. The method as recited in claim 1, further comprising the step of modeling said echo impulse response over a predetermined number of samples and wherein step (c) utilizes said modeled echo impulse response to compute said SIRF coefficients.

4. The method as recited in claim 2, further comprising the step of offsetting, to a predetermined sample, the start of said sample set upon which said modeled channel impulse response is based.

5. The method as recited in claim 3, further comprising the step of offsetting, to a predetermined sample, the start of said sample set upon which said modeled echo impulse response is based.

6. The method as recited in claim 2, further comprising the steps of selecting a starting sample for said sample set upon which said modeled channel impulse response is based, calculating a SSNR for said SIRF coefficients as determined by said modeled channel impulse response, repeating the steps of modeling said channel impulse response and calculating a SSNR a predetermined number of times each time with a newly selected starting sample, and utilizing those SIRF coefficients corresponding to the modeled channel impulse response with the best SSNR.

7. The method as recited in claim 3, further comprising the steps of selecting a starting sample for said sample set upon which said modeled echo impulse response is based, calculating a SSNR for said SIRF coefficients as determined by said modeled echo impulse response, repeating the steps of modeling said echo impulse response and calculating a SSNR a predetermined number of times each time with a newly selected starting sample, and utilizing those SIRF coefficients corresponding to the modeled echo impulse response with the best SSNR.

8. A data communication system, comprising:

a first transceiver capable of generating a communication signal;

a second transceiver acting as a destination for said communication signal;

a channel linking said first transceiver to said second transceiver wherein said channel has a channel impulse response which functions to distort said communication signal;

an echo path local to said second transceiver having an echo impulse response which further functions to distort said communication signal; and a SIRF provided as a component part of said second transceiver having coefficients explicitly selected to jointly minimize distortions created by said channel impulse response and said echo impulse response.

9. The data communication system as recited in claim 8, wherein said second transceiver further comprises:

means for approximating said channel impulse response and said echo impulse response;

means for modeling said channel impulse response based upon said approximated channel impulse response;

means for modeling said echo impulse response based upon said approximated echo impulse response;

means for computing SIRF coefficients jointly based upon said modeled channel impulse response and said modeled echo impulse response;

means for calculating a SSNR for said computed SIRF coefficients; and means for utilizing those computed SIRF coefficients having the best SSNR.

10. In a data transmission system including a transmitter, a distorting channel, a distorting echo path, and a receiver including a SIRF, a method for efficiently minimizing distortions in said data transmission system jointly caused by said distorting channel and by said distorting echo path comprising the steps of:

(a) approximating the channel impulse response of said distorting channel;

(b) approximating the echo impulse response of said distorting echo path;

(c) modeling said channel impulse response from said approximated channel impulse response;

(d) modeling said echo impulse response from said approximated echo impulse response;

(e) computing a set of time domain SIRF coefficients jointly based upon said modeled channel impulse response and said modeled echo impulse response; and (f) utilizing said SIRF coefficients in said SIRF to efficiently minimize distortions in said data transmission system jointly caused by said channel and said echo path.

11. The method as recited in claim 10, further comprising the step of placing said modeled channel impulse response at a starting sample location which avoids any flat delay in said approximated channel impulse response.

12. The method as recited in claim 10, further comprising the step of placing said modeled echo impulse response at a starting sample location which provides the best SSNR.

13. The method as recited in claim 12, further comprising the step of placing said modeled impulse response at a starting sample location which avoids any flat delay in said approximated channel impulse response.

14. The method as recited in claim 10, further comprising the steps of selecting a starting sample for said sample set upon which said modeled channel impulse response is based, selecting a starting sample for said sample set upon which said modeled echo impulse response is based, calculating a SSNR for said SIRF coefficients as jointly determined by said modeled impulse response and said modeled echo impulse response, repeating the steps of modeling said channel impulse response, modeling said echo impulse response, and calculating a SSNR a predetermined number of times each time with a newly selected starting channel and/or echo sample, and utilizing those SIRF coefficients corresponding to the modeled impulse response with the best SSNR.

15. The method as recited in claim 13, further comprising the steps of selecting a starting sample for said sample set upon which said modeled channel impulse response is based, selecting a starting sample for said sample set upon which said modeled echo impulse response is based, calculating a SSNR for said SIRF coefficients as jointly determined by said modeled impulse response and said modeled echo impulse response, repeating the steps of modeling said channel impulse response, modeling said echo impulse response, and calculating a SSNR a predetermined number of times each time with a newly selected starting channel and/or echo sample, and utilizing those SIRF coefficients corresponding to the modeled impulse response with the best SSNR.

* * * * *

UNITED STATES PATENT AND TRADEMARK OFFICE
CERTIFICATE OF CORRECTION

PATENT NO. : 5,521,908
DATED : May 28, 1996
INVENTOR(S) : YOUNCE ET AL.

It is certified that error appears in the above-indentified patent and that said Letters Patent is hereby corrected as shown below:

IN COLUMN 4:

line 40: "$\left(\frac{c}{B}\right)^b \approx c \approx c.$" Should read -- $\left(\frac{c}{B}\right)^{b'} \approx c' \approx c'$ --

Signed and Sealed this

Seventeenth Day of December, 1996

*Attest:*

BRUCE LEHMAN

*Attesting Officer*     *Commissioner of Patents and Trademarks*